(12) United States Patent
Zhu et al.

(10) Patent No.: US 10,100,379 B2
(45) Date of Patent: Oct. 16, 2018

(54) SYSTEM AND METHOD FOR FLUIDIZED DIRECT REDUCTION OF IRON ORE CONCENTRATE POWDER

(71) Applicants: INSTITUTE OF PROCESS ENGINEERING, CHINESE ACADEMY OF SCIENCES, Beijing (CN); BEIJING ZHONGKAIHONGDE TECHNOLOGY CO., LTD., Beijing (CN)

(72) Inventors: Qingshan Zhu, Beijing (CN); Chuanlin Fan, Beijing (CN); Hongzhong Li, Beijing (CN); Zhaohui Xie, Beijing (CN); Wenheng Mu, Beijing (CN); Cunhu Wang, Beijing (CN); Xingang Jiao, Beijing (CN)

(73) Assignees: INSTITUTE OF PROCESS ENGINEERING, CHINESE ACADEMY OF SCIENCES, Beijing (CN); BEIJING ZHONGKAIHONGDE TECHNOLOGY CO., LTD., Beijing (CN)

( * ) Notice: Subject to any disclaimer, the term of this patent is extended or adjusted under 35 U.S.C. 154(b) by 364 days.

(21) Appl. No.: 15/109,400

(22) PCT Filed: Dec. 30, 2014

(86) PCT No.: PCT/CN2014/095711
§ 371 (c)(1),
(2) Date: Aug. 22, 2016

(87) PCT Pub. No.: WO2015/101306
PCT Pub. Date: Jul. 9, 2015

(65) Prior Publication Data
US 2016/0348198 A1 Dec. 1, 2016

(30) Foreign Application Priority Data

Dec. 31, 2013 (CN) .......................... 2013 1 0750711

(51) Int. Cl.
*C21B 13/00* (2006.01)
*F27B 15/10* (2006.01)
(Continued)

(52) U.S. Cl.
CPC ........ *C21B 13/0033* (2013.01); *C21B 13/146* (2013.01); *F27B 15/003* (2013.01);
(Continued)

(58) Field of Classification Search
None
See application file for complete search history.

(56) References Cited

U.S. PATENT DOCUMENTS

| | | | | |
|---|---|---|---|---|
| 5,382,277 A | * | 1/1995 | Rose .......................... | C01B 3/36 266/172 |
| 5,833,734 A | * | 11/1998 | Cip ...................... | C21B 13/0033 75/450 |

(Continued)

FOREIGN PATENT DOCUMENTS

| CA | 2185248 A1 | 3/1997 |
|---|---|---|
| CN | 101386908 A | 3/2009 |

(Continued)

OTHER PUBLICATIONS

International Search Report for International Application No. PCT/CN2014/095711, dated Apr. 1, 2015.

*Primary Examiner* — George Wyszomierski
(74) *Attorney, Agent, or Firm* — Gokalp Bayramoglu

(57) ABSTRACT

A system and method for the fluidized direct reduction of iron ore concentrate powder. A two-phase fluidized bed is used for the direct reduction of iron ore concentrate powder. Each phase of the fluidized bed is formed by a bubbling bed
(Continued)

and a circulating bed. Use of serial-connection processing involving gas and of high-gas-velocity processing of the circulating bed increase the gas utilization rate and the reduction efficiency of single-phase reduction. Once reduced gases are subjected to preheating, each gas is sent into an initial reduction phase and a final reduction phase so as to implement reduction of minerals. Use of mixed-connection processing involving gas appropriately reduces processing pressure. Hot flue gas produced by combustion in a gas heater is sent to a mineral pre-heating system that is used for pre-heating iron ore concentrate powder.

7 Claims, 1 Drawing Sheet

(51) Int. Cl.
 *C21B 13/14* (2006.01)
 *F27B 15/00* (2006.01)
 *F27B 15/02* (2006.01)
 *F27B 15/14* (2006.01)
 *F27B 15/18* (2006.01)

(52) U.S. Cl.
 CPC .............. *F27B 15/02* (2013.01); *F27B 15/10* (2013.01); *F27B 15/14* (2013.01); *F27B 15/18* (2013.01); *C21B 2100/66* (2017.05); *Y02P 10/136* (2015.11)

(56) References Cited

U.S. PATENT DOCUMENTS

| | | | | |
|---|---|---|---|---|
| 5,897,829 A | * | 4/1999 | Kim | .................... C21B 13/0033 266/156 |
| 6,235,079 B1 | * | 5/2001 | Choi | .................... C21B 13/0033 266/172 |
| 2007/0256519 A1 | * | 11/2007 | Orth | .................... C21B 13/0033 75/448 |

FOREIGN PATENT DOCUMENTS

| | | |
|---|---|---|
| CN | 101880059 A | 11/2010 |
| CN | 103031433 A | 4/2013 |
| CN | 103667571 A | 3/2014 |

\* cited by examiner

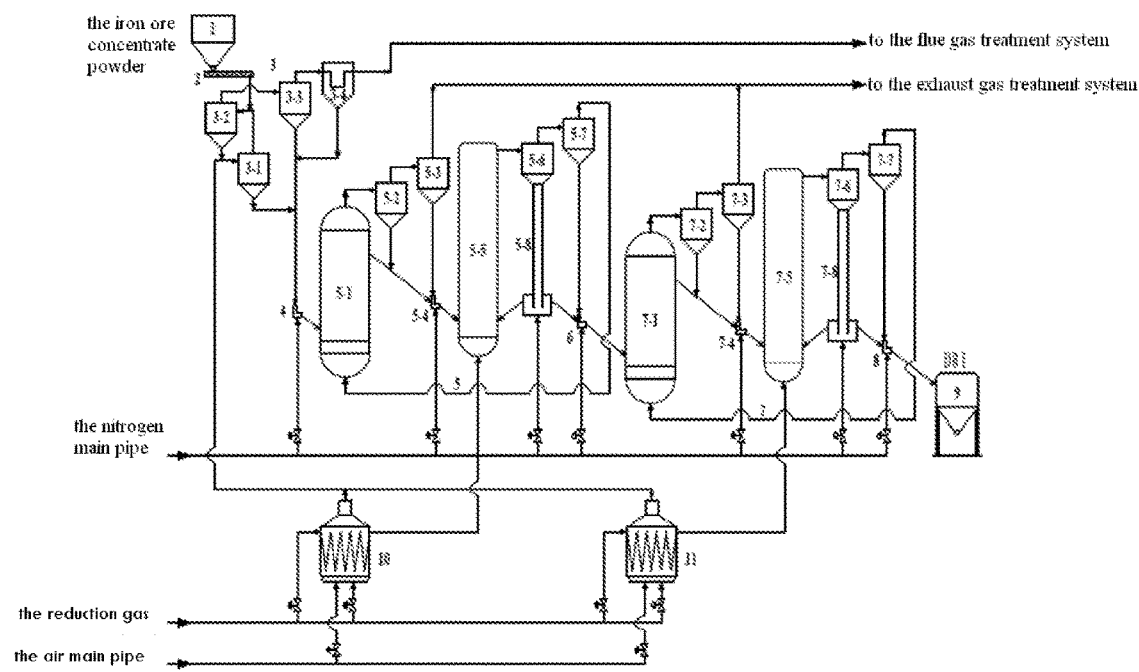

SYSTEM AND METHOD FOR FLUIDIZED DIRECT REDUCTION OF IRON ORE CONCENTRATE POWDER

CROSS-REFERENCE TO RELATED APPLICATIONS

The present application is the US National Phase of International Patent Application No. PCT/CN2014/095711, filed Dec. 30, 2014, which claims priority to Chinese Application No. 201310750711.6, filed Dec. 31, 2013, each of which is incorporated by reference in its entirety.

FIELD OF THE INVENTION

The present invention belongs to the fields of chemical engineering and metallurgy, and particularly relates to a system and method for the direct reduction of iron ore concentrate powder using a fluidized bed.

BACKGROUND OF THE INVENTION

With the rapid development of the steel and iron industry, the shortcomings of the blast furnace ironmaking processes such as heavy dependence on metallurgical coke, high requirements on pellets for use, high energy consumption, and severe pollution become more and more prominent, and the direct reduction ironmaking processes without need of metallurgical coke therefore draw more and more attention. The global production of directly reduced iron reached 73.32 million tons in 2011, and with the continuous development of short-flow processes and electrical furnace steelmaking processes in the global iron and steel industry, robust demands for directly reduced iron, a high-quality steelmaking raw material, will further push its production. The direct-reduction ironmaking technology has become one of the important development directions for new-generation steel and iron technologies.

At present, there are many direct-reduction steelmaking methods proposed both domestically and abroad, which can be classified according to the types of reduction reactors into direct reduction processes using rotary kiln (e.g., the SL/RN method, the Chinese patent application 200710138915.9), rotary furnace (e.g., the Chinese patent applications 200810302482.0 and 201110236682.2), shaft furnace (e.g., the Midrex method, the HYL III method, the Chinese patent application 20111044319.4) and fluidized bed (e.g., the FIOR method, the FIMET method, the Carbide method, the HIB method, the Chinese patent application 201110006745.5), etc.

As compared to other processes, fluidized direct reduction has the following obvious advantages. (1) It can be used to directly process iron ore concentrate powder material, thus eliminating the sintering or pelletizing process. Moreover, it shows ever more prominent advantages in processing mineral powders, since with the continuous exploration of iron ore resources, finer and finer iron ore concentrates will be obtained through grinding and selection of lean ores. (2) Gas-based fluidized reduction of ore fines having relatively large specific surface areas realizes reduction at a low temperature due to low mass transfer resistance and high heat transfer efficiency, and is expected to break through the bottlenecks of conventional direct reduction in efficiency and cost. (3) It can be used to treat complex paragenic ores. For example, fluidized direct reduction-melting separation of vanadium-titanium magnetite concentrate can produce iron, and concentrate vanadium and titanium in the residue.

However, since direct reduction of iron ore concentrate consumes a large amount of reducing gas, and since the reduction reaction is an endothermic reaction, sufficient heat needs to be provided for the fluidized reduction process, besides heating the material to a high temperature, so that the reaction can be performed smoothly. According to relevant industrial test data, the energy consumption for producing hot briquetted iron by the FIOR/FINMET method is about 15.0 GJ per ton, which is much higher than 10.5 GJ of the MIDREX method based on the shaft furnace, suggesting that the processes based on fluidized beds still have much room for improvement in reducing energy consumption. Therefore, how to reasonably improve heat utilization and reduction efficiency is the key to realize large-scale industrial applications of fluidized direct reduction of iron ore concentrate.

The existing processes usually use 2- to 4-stage fluidized beds to conduct fluidized direct reduction of iron ore concentrate. In the process flows of the FIOR method (e.g., the U.S. Pat. No. 5,082,251), the FIMET method (Gerhard Deimek, Steel, 2000, 12: 13-15) and the FINEX method (Shourong Zhang, and Shaoxian Zhang, Steel, 2009, 5: 1-5), four-stage fluidized beds are used. Mineral powder is put into the first stage fluidized bed without preheating, and the preheated reducing gas enters from the last stage fluidized bed and passes through the multi-stage fluidized beds in series. Since there is no intermediary heat supplementation, the temperature declines to below 600° C. at the first and second stages of fluidized beds, at which temperature the reduction rate of the mineral is rather slow and thus the mineral powder is mainly preheated. The reduction of the mineral powder mainly occurs at the subsequent third and fourth stage fluidized beds in series, and therefore the reduction efficiency of the fluidized bed reduction system decreases. Like the mainstream FIOR/FINMET and FINEX processes, the patents relating to reduction using four-stage fluidized beds also include: US20120328465 (2012), CN101892339 (2012), CN101397597 (2010), CN101519707 (2010), CN100560739 (2009), US20080277842 (2008), AU2001265669 (2001) and so on. In these processes, the reducing gas is operated in a serial mode, with high operating pressures and high consumptions for gas compression. Moreover, the reduction exhaust gas (generated in latter stages of fluidized beds) only utilize the sensible heat to preheat the mineral powder in the preceding stages of fluidized beds, with poor mineral powder preheating and reduction results.

In the Circore method (S. A. Elmquist, P. Weber, H. Eichberger, and Yuming Wang. World Steel, 2009, 2: 12-16) developed by Lurgi, Germany, hydrogen is used as a reducing agent. Iron ore powder and exhaust gas from the preheating fast bed enter into the fast fluidized bed with heat supply by direct fuel combustion through venturi and cyclone for drying and preheating to a temperature of 850-900° C., and are sent into the circulating fluidized bed (the first stage) at a temperature of 630-650° C. after being lifted into the ore bucket by the air for pre-reduction. Such preheating of iron ore powder by a fluidized bed is similar to those of the FIOR method and the FIMET method, except for relatively complex operations. The pre-reduced mineral powder discharged from the circulating bed is sent to the bubbling fluidized bed (the second stage) at a temperature of about 680° C. and a pressure of 0.4 MPa for final reduction. The high-temperature exhaust gas discharged from the circulating fluidized bed exchanges heat with the circulating gas, and is purified, compressed and recycled.

Lurgi also developed the Circofer method (U.S. Pat. No. 5,433,767; Shi Qiu, *Sintering and Pelletizing*, 1995, 2: 38-42) that uses coal as the main energy resource. In this method, iron ore powder, additives and hot exhaust gas discharged from the first stage fluidized bed (the circulating fluidized bed) are preheated by two stages of venturi preheaters. After the materials discharged from the first stage venturi preheater are separated by the cyclone, the resultant solid materials are sent into the second stage venturi preheater. After the materials discharged from the second stage venturi preheater are separated by the cyclone, the gas is sent to the first stage venturi preheater. During the above operation process, powder materials tend to recurrent accumulation in the preheating system. The solid materials discharged by separation through the second stage venturi preheater-cyclone are sent into the heat generator with heat supply by direct coal combustion for further preheating and generation of reducing gas, are re-sent into the first stage fluidized bed at a temperature of 950° C. for pre-reduction until the metallization rate reaches around 80%, and then enter into the second stage fluidized bed at a temperature of 850° C. for final reduction. The coal powder added to the heat generator can hardly undergo a sufficient reaction, and is discharged along with the directly reduced iron after passing through two stages of reduction fluidized beds. The residue coal powder subsequently needs to undergo magnetic separation to be recycled, thereby increasing the complexity of the operation.

The Outotec Company also proposed a fluidized bed direct reduction system based on a fluidized bed heated by combustion of carbonic material (the U.S. Pat. No. 7,608,128B2, and the Chinese invention patent ZL200580017740.5), which is similar to the Circofer method, and mainly consists of a heat-supply fluidized bed and a reduction fluidized bed. After being preheated by the hot flue gas discharged from the gas outlet of the cyclone separator of the reduction fluidized bed through two stages of mixed chambers-cyclones, ore enters into the reduction fluidized bed for reduction, which, however, is hardly preheated to the reduction temperature by the sensible heat of the reduction exhaust gas. The solid material discharged from the feed outlet of the cyclone separator of the reduction fluidized bed enters into the heat-supply fluidized bed. The coal powder added to the heat-supply fluidized bed is fluidized in the upward flow of the fluidizing (non-oxidative) air, and combusts to give a large amount of heat under the influence of oxygen-containing gas ejected downward from the water cooled lance installed in the heat-supply fluidized bed, which is provided to the reduction fluidized bed in the form of a dust-containing hot flue gas through the flue gas tube at the top of the heat-supply fluidized bed. The reducing fluidizing gas passes through the lower part of the reduction fluidized bed to realize the fluidized reduction of the mineral powder. Moreover, similar water-cooled oxygen-containing gas lance can be added in the reduction fluidized bed to realize effective control of fine particle agglomeration by introducing oxygen. The reduction exhaust gas after heat exchange with ore is recycled as the fluidizing gas after further solid stripping, cooling, dewatering, carbon dioxide removal, compression and reheating. This reduction system also has the problems of insufficient reaction of coal powder with complex operations for subsequent separation and recycling, and low efficiency in mineral powder preheating.

In addition to increasing system heat utilization and reducing energy consumption through technical innovations, the processes of iron ore concentrate reduction on fluidized beds still face the following two key problems: (1) High operating pressure. The existing multi-stage fluidized bed processes such as FIOR/FINMET and FINEX mainly employ gas serial operation and high pressure operation in order to reduce the diameter of the fluidized bed, thereby leading to high energy consumption during the air compression process. (2) Low reduction efficiency. Although most processes use four-stage fluidized beds for reduction, no intermediary heat supplementation for the gas passing from the fourth stage to the first stage fluidized beds in series results in gradual reduction of the reaction temperature from the fourth stage to the first stage. Since the last two stages play a minor role in the reduction, the overall reduction efficiency is low. Therefore, lowering operating pressure of the fluidized beds and increasing the overall reduction efficiency of the multi-stage fluidized beds through technological and technical innovations are crucial for improvement in economic efficiency of the reduction process.

SUMMARY OF THE INVENTION

In view of the above problems, the present invention provides a system and method for fluidized direct reduction of iron ore concentrate powder, which can reduce the operating pressure, increase the reduction efficiency, and achieve economic direct reduction. In order to achieve the above object, the present invention employs the following technical solutions.

The present invention provides a system for fluidized direct reduction of iron ore concentrate powder, comprising: an ore powder bin 1, a screw feeder 2, an ore powder preheater 3, a pre-reduction section feeder 4, a pre-reduction section fluidized bed 5, a final reduction section feeder 6, a final reduction section fluidized bed 7, a discharger 8, a product bin 9, a pre-reduction section gas heater 10 and a final reduction section gas heater 11.

The ore powder preheater 3 comprises a first cyclone separator 3-1, a second cyclone separator 3-2, a cyclone dust collector 3-3 and a bag dust collector 3-4.

The pre-reduction section fluidized bed 5 comprises a primary bubbling bed body 5-1, a third cyclone separator 5-2, a fourth cyclone separator 5-3, a pre-reduction section inter-bed feeder 5-4, a primary circulating bed riser 5-5, a fifth cyclone separator 5-6, a sixth cyclone separator 5-7 and a primary circulating dipleg 5-8.

The final reduction section fluidized bed 7 comprises a secondary bubbling bed body 7-1, a seventh cyclone separator 7-2, an eighth cyclone separator 7-3, a final reduction section inter-bed feeder 7-4, a secondary circulating bed riser 7-5, a ninth cyclone separator 7-6, a tenth cyclone separator 7-7 and a secondary circulating dipleg 7-8.

A feed outlet at the bottom of the ore powder bin 1 is provided with a pipeline which is connected to a feed inlet of the screw feeder 2. A feed outlet of the screw feeder 2 is connected to an inlet of the second cyclone separator 3-2 through a pipeline. There is provided with a pipeline connecting a feed outlet at the bottom of the second cyclone separator 3-2 to an inlet of the first cyclone separator 3-1. There is provided with a pipeline connecting the inlet of the first cyclone separator 3-1 to each of a flue gas outlet of the pre-reduction section gas heater 10 and a flue gas outlet of the final reduction section gas heater 11. There is provided with a pipeline connecting a gas outlet of the first cyclone separator 3-1 to the inlet of the second cyclone separator 3-2. There is provided with a pipeline connecting a gas outlet of the second cyclone separator 3-2 to an inlet of the cyclone dust collector 3-3. A gas outlet of the cyclone dust collector 3-3 is connected to an inlet of the bag dust collector 3-4 through a pipeline. A gas outlet of the bag dust collector 3-4 is connected to a flue gas treatment system through a pipeline. There is provide with a pipeline connecting each of a feed outlet at the bottom of the first cyclone separator 3-1, a feed outlet at the bottom of the cyclone dust collector 3-3 and a feed outlet of the bag dust collector 3-4 to a feed inlet of the pre-reduction section feeder 4.

A discharge port of the pre-reduction section feeder 4 is connected to a feed inlet at the lower portion of the primary bubbling bed body 5-1 of the pre-reduction section fluidized bed 5 through a pipeline. A gas inlet at the bottom of the primary bubbling bed body 5-1 is connected to a gas outlet of the sixth cyclone separator 5-7 through a pipeline. There is provided with a pipeline connecting a gas outlet of the primary bubbling bed body 5-1 to an inlet of the third cyclone separator 5-2. A gas outlet of the third cyclone separator 5-2 is connected to an inlet of the fourth cyclone separator 5-3 through a pipeline. There is provided with a pipeline connecting a gas outlet of the fourth cyclone separator 5-3 to an exhaust gas treatment system. There is provided with a pipeline connecting each of a feed outlet at the upper portion of the primary bubbling bed body 5-1, a feed outlet at the bottom of the third cyclone separator 5-2 and a feed outlet at the bottom of the fourth cyclone separator 5-3 to a feed inlet of the pre-reduction section inter-bed feeder 5-4. A discharge port of the pre-reduction section inter-bed feeder 5-4 is connected to a feed inlet at the lower portion of the primary circulating bed riser 5-5 through a pipeline. A gas inlet at the bottom of the primary circulating bed riser 5-5 is connected to a gas outlet of the pre-reduction section gas heater 10 through a pipeline. An outlet at the top of the primary circulating bed riser 5-5 is connected to an inlet of the fifth cyclone separator 5-6 through a pipeline. A gas outlet at the top of the fifth cyclone separator 5-6 is connected to an inlet of the sixth cyclone separator 5-7 through a pipeline. The primary circulating dipleg 5-8 is provided at the lower portion of the fifth cyclone separator 5-6, and a return port at the lower portion of the primary circulating dipleg 5-8 is connected to a return port at the lower portion of the primary circulating bed riser 5-5 through a pipeline. There is provided with a pipeline connecting each of a discharge port at the lower portion of the primary circulating dipleg 5-8 and a feed outlet at the bottom of the sixth cyclone separator 5-7 to a feed inlet of the final reduction section feeder 6.

A discharge port of the final reduction section feeder 6 is connected to a feed inlet at the lower portion of the secondary bubbling bed body 7-1 of the final reduction section fluidized bed 7 through a pipeline. A gas inlet at the bottom of the secondary bubbling bed body 7-1 is connected to a gas outlet of the tenth cyclone separator 7-7 through a pipeline. There is provided with a pipeline connecting a gas outlet of the secondary bubbling bed body 7-1 to an inlet of the seventh cyclone separator 7-2. A gas outlet of the seventh cyclone separator 7-2 is connected to an inlet of the eighth cyclone separator 7-3 through a pipeline. There is provided with a pipeline connecting a gas outlet of the eighth cyclone separator 7-3 to the exhaust gas treatment system. There is provided with a pipeline connecting each of a feed outlet at the upper portion of the secondary bubbling bed body 7-1, a feed outlet at the bottom of the seventh cyclone separator 7-2 and a feed outlet at the bottom of the eighth cyclone separator 7-3 to a feed inlet of the final reduction section inter-bed feeder 7-4. A discharge port of the final reduction section inter-bed feeder 7-4 is connected to a feed inlet at the lower portion of the secondary circulating bed riser 7-5 through a pipeline. A gas inlet at the bottom of the secondary circulating bed riser 7-5 is connected to a gas outlet of the final reduction section gas heater 11 through a pipeline. An outlet at the top of the secondary circulating bed riser 7-5 is connected to an inlet of the ninth cyclone separator 7-6 through a pipeline. A gas outlet at the top of the ninth cyclone separator 7-6 is connected to an inlet of the tenth cyclone separator 7-7 through a pipeline. The secondary circulating dipleg 7-8 is provided at the lower portion of the ninth cyclone separator 7-6, and a return port at the lower portion of the secondary circulating dipleg 7-8 is connected to a return port at the lower portion of the secondary circulating bed riser 7-5 through a pipeline. There is provided with a pipeline connecting each of a discharge port at the lower portion of the secondary circulating dipleg 7-8 and a feed outlet at the bottom of the tenth cyclone separator 7-7 to an feed inlet of the discharger 8. There is provided with a pipeline connecting a discharge port of the discharger 8 to a feed inlet of the product bin 9.

Each of a gas inlet at the bottom of the pre-reduction section feeder 4, a gas inlet at the bottom of the pre-reduction section inter-bed feeder 5-4, a gas inlet at the bottom of the primary circulating dipleg 5-8, a gas inlet at the bottom of the final reduction section feeder 6, a gas inlet at the bottom of the final reduction section inter-bed feeder 7-4, a gas inlet at the bottom of the secondary circulating dipleg 7-8 and a gas inlet at the bottom of the discharger 8 is provided with a pipeline connected to a nitrogen main pipe, and each of the pipelines is provided with a regulating valve.

There is provided with a pipeline connecting each of a gas inlet of the pre-reduction section gas heater 10, a fuel gas inlet of the pre-reduction section gas heater 10, a gas inlet of the final reduction section gas heater 11 and a fuel gas inlet of the final reduction section gas heater 11 to a reducing gas main pipe, and each of the pipelines is provided with a regulating valve. There is provided with a pipeline connecting each of a combustion supporting air inlet of the pre-reduction section gas heater 10 and a combustion supporting air inlet of the final reduction section gas heater 11 to an air main pipe, and each of the pipelines is provided with a regulating valve.

The present invention provides a method for fluidized direct reduction of iron ore concentrate powder using the above system, comprising: allowing the powder and gas to enter into and pass through the system simultaneously in the following way: the iron ore concentrate powder enters into the second cyclone separator 3-2 from the ore powder bin 1 via the screw feeder 2 for exchanging heat with the flue gas from the first cyclone separator 3-1, then enters into the first cyclone separator 3-1 for further exchanging heat with the hot flue gas from the reducing gas heater 10 and the final reducing gas heater 11, and then enters into the primary bubbling bed body 5-1 together with the powder collected by the cyclone dust collector 3-3 and the bag dust collector via the pre-reduction section feeder 4. The powder discharged from the feed outlet at the upper portion of the primary bubbling bed body 5-1 and the powder collected by the third cyclone separator 5-2 and the fourth cyclone separator 5-3 enter into the primary circulating bed riser 5-5 via the pre-reduction section inter-bed feeder 5-4. Part of the powder discharged from the outlet at the top of the primary circulating bed riser 5-5 is discharged via discharge ports at the lower portions of the fifth cyclone separator 5-6 and the primary circulating dipleg 5-8, and enters into the secondary bubbling bed body 7-1 together with the powder collected by the sixth cyclone separator 5-7 via the final reduction section feeder 6. The powder discharged from the feed outlet at the upper portion of the secondary bubbling bed body 7-1 and the powder collected by the seventh cyclone separator 7-2 and the eighth cyclone separator 7-3 enter into the secondary circulating bed riser 7-5 via the final reduction section inter-bed feeder 7-4. Part of the powder discharged from the outlet at the top of the secondary circulating bed riser 7-5 is discharged via discharge ports at the lower portions of the ninth cyclone separator 7-6 and the secondary circulating dipleg 7-8, and enter into the product bin 9 together with the powder collected by the tenth cyclone separator 7-7 via the discharger 8. The reducing gas is preheated by the pre-reducing gas heater 10, then enters into the primary circulating bed riser 5-5 to contact and reduce the ore powder, and enters into the primary bubbling bed body 5-1 via the fifth cyclone separator 5-6 and the sixth cyclone separator 5-7 for further reacting with the ore powder, and then is subjected to powder removing treatment by the third cyclone separator 5-2 and the fourth cyclone separator 5-3 and then enters into the exhaust gas treatment system via the pipeline. The reducing gas is preheated by the final reducing gas heater 11, then enters into the secondary circulating bed riser 7-5 to contact and reduce the ore powder, then enters into the secondary bubbling bed body 7-1 through the ninth cyclone separator 7-6 and the tenth cyclone separator 7-7 for further reaction with the ore powder, then is subjected to powder removing treatment by the seventh cyclone separator 7-2 and the eighth cyclone separator 7-3, and then enters into the exhaust gas treatment system via a pipeline. In the meantime, nitrogen enters into the reducing system through the gas inlet at the bottom of the pre-reduction section feeder 4, the gas inlet at the bottom of the pre-reduction section inter-bed feeder 5-4, the gas inlet at the bottom of the primary circulating dipleg 5-8, the gas inlet at the bottom of the final reduction section feeder 6, the gas inlet at the bottom of the final reduction section inter-bed feeder 7-4, the gas inlet at the bottom of the secondary circulating dipleg 7-8 and the gas inlet at the bottom of the discharger 8. The air and the reducing gas enter into the pre-reducing gas heater 10 and the final reducing gas heater 11 via the nozzle for combustion to generate heat for preheating the reducing gas, then enter into the first cyclone separator 3-1 and the second cyclone separator 3-2 sequentially to contact and exchange heat with the iron ore concentrate powder, and are subjected to solid removing treatment by the cyclone dust collector 3-3 and the bag dust collector 3-4, then enter into the flue gas treatment system via the pipeline. The iron oxide in the ore is reduced to metallic iron after the iron ore concentrate powder is subjected to preheating and two stages of reduction, and the reduction product is discharged to the product bin 9.

The first feature of the above direct reduction method is that the iron ore concentrate powder is an iron-containing material powder with a total iron content of 50-70 wt %, which is obtained from mineral processing and enrichment of natural mineral or industrial solid waste, and the iron ore concentrate powder has a particle size of 0.01-0.5 mm.

The second feature of the above direct reduction method is that both of the primary circulating bed riser and the secondary circulating bed riser are operated at a high gas velocity of 5-10 m/s.

The third feature of the above direct reduction method is that the flue gas temperature at the inlet of the first cyclone separator of the ore powder preheater is 500-700° C., the reduction temperature of the pre-reduction section fluidized bed is 650-850° C., and the reduction temperature of the final reduction section fluidized bed is 850-950° C.

The fourth feature of the above direct reduction method is that the reducing gas is coal gas or reformed gas with $H_2$ and CO as active ingredients and having a caloric value of 10-20 $MJ/Nm^3$.

One of the improvements of the present invention lies in that the direct reduction of iron ore concentrate powder is conducted using a two-stage fluidized bed, wherein each stage of the fluidized bed is composed of a bubbling bed and a circulating bed. The operation at a high gas velocity through the circulating fluidized bed can effectively decrease the diffusion mass transfer resistance, thereby increasing the reduction efficiency.

The further improvement of the present invention lies in that the reducing gas enters into the pre-reduction section and the final reduction section in parallel after being preheated. The reducing gas passes through the circulating fluidized bed and the bubbling fluidized bed in series in each reduction section. Such an operation in a mixed mode can both effectively reduce the operating pressure and increase the utilization ratio of the reducing gas.

The yet further improvement of the present invention lies in that the hot flue gas generated from combustion in the reducing gas heater, after exchanging heat with the reducing gas, is further sent to the ore powder preheater for preheating the iron ore concentrate powder, thereby increasing the energy utilization efficiency.

Based on the above improvements, the present invention offers advantages such as high reduction efficiency, high utilization of reducing gas and heat, and so on, and can effectively decrease the operating pressure and energy consumption of fluidized reduction, thereby improving the economy of fluidized direct reduction of iron ore concentrate powder.

BRIEF DESCRIPTION OF THE DRAWINGS

FIG. 1 is a schematic diagram illustrating the system and method for direct reduction of iron ore concentrate powder using a two-stage fluidized bed according to the present invention.

REFERENCE SIGNS 1. ore powder bin
2. screw feeder
3. ore powder preheater
3-1. first cyclone separator    3-2. second cyclone separator
3-3. cyclone dust collector     3-4. bag dust collector
4. pre-reduction section feeder
5. pre-reduction section fluidized bed
5-1. primary bubbling bed body  5-2. third cyclone separator
5-3. fourth cyclone separator   5-4. pre-reduction section inter-bed feeder
5-5. primary circulating bed riser  5-6. fifth cyclone separator
5-7. sixth cyclone separator    5-8. primary circulating dipleg
6. final reduction section feeder
7. final reduction section fluidized bed
7-1. secondary bubbling bed body  7-2. seventh cyclone separator
7-2. eighth cyclone separator   7-4. a final reduction section inter-bed feeder
7-5. secondary circulating bed riser  7-6. ninth cyclone separator
7-7. tenth cyclone separator    7-8. secondary circulating dipleg
8. discharger
9. product bin
10. pre-reduction section gas heater
11. final reduction section gas heater

DETAILED DESCRIPTION OF THE INVENTION

In order to make the purpose, technical solutions and advantages of the present invention more apparent, a clear and complete description about the technical solutions of the examples in the present invention will be provided below with reference to the accompanying drawings of the examples of the present invention. Obviously, the examples described below are part of the examples of the present invention, rather than all of the examples. It should be noted that the examples are merely intended to illustrate, rather than limit, the technical solutions of the present invention. FIG. 1 is a schematic diagram illustrating a system and method for fluidized direct reduction of iron ore concentrate powder according to the present invention.

In reference to FIG. 1, a system for fluidized direct reduction of iron ore concentrate powder used in the present example comprises an ore powder bin 1, a screw feeder 2, an ore powder preheater 3, a pre-reduction section feeder 4, a pre-reduction section fluidized bed 5, a final reduction section feeder 6, a final reduction section fluidized bed 7, a discharger 8, a product bin 9, a pre-reduction section gas heater 10 and a final reduction section gas heater 11.

The ore powder preheater 3 comprises a first cyclone separator 3-1, a second cyclone separator 3-2, a cyclone dust collector 3-3 and a bag dust collector 3-4. The pre-reduction section fluidized bed 5 comprises a primary bubbling bed body 5-1, a third cyclone separator 5-2, a fourth cyclone separator 5-3, a pre-reduction section inter-bed feeder 5-4, a primary circulating bed riser 5-5, a fifth cyclone separator 5-6, a sixth cyclone separator 5-7 and a primary circulating dipleg 5-8. The final reduction section fluidized bed 7 comprises a secondary bubbling bed body 7-1, a seventh cyclone separator 7-2, an eighth cyclone separator 7-3, a final reduction section inter-bed feeder 7-4, a secondary circulating bed riser 7-5, a ninth cyclone separator 7-6, a tenth cyclone separator 7-7 and a secondary circulating dipleg 7-8.

A feed outlet at the bottom of the ore powder bin 1 is provided with a pipeline which is connected to a feed inlet of the screw feeder 2. A feed outlet of the screw feeder 2 is connected to an inlet of the second cyclone separator 3-2 through a pipeline. There is provided with a pipeline connecting a feed outlet at the bottom of the second cyclone separator 3-2 to an inlet of the first cyclone separator 3-1. There is provided with a pipeline connecting the inlet of the first cyclone separator 3-1 to each of a flue gas outlet of the pre-reduction section gas heater 10 and a flue gas outlet of the final reduction section gas heater 11. There is provided with a pipeline connecting a gas outlet of the first cyclone separator 3-1 to the inlet of the second cyclone separator 3-2. There is provided with a pipeline connecting a gas outlet of the second cyclone separator 3-2 to an inlet of the cyclone dust collector 3-3. A gas outlet of the cyclone dust collector 3-3 is connected to an inlet of the bag dust collector 3-4 through a pipeline. A gas outlet of the bag dust collector 3-4 is connected to a flue gas treatment system through a pipeline. There is provide with a pipeline connecting each of a feed outlet at the bottom of the first cyclone separator 3-1, a feed outlet at the bottom of the cyclone dust collector 3-3 and a feed outlet of the bag dust collector 3-4 to a feed inlet of the pre-reduction section feeder 4.

A discharge port of the pre-reduction section feeder 4 is connected to a feed inlet at the lower portion of the primary bubbling bed body 5-1 of the pre-reduction section fluidized bed 5 through a pipeline. A gas inlet at the bottom of the primary bubbling bed body 5-1 is connected to a gas outlet of the sixth cyclone separator 5-7 through a pipeline. There is provided with a pipeline connecting a gas outlet of the primary bubbling bed body 5-1 to an inlet of the third cyclone separator 5-2. A gas outlet of the third cyclone separator 5-2 is connected to an inlet of the fourth cyclone separator 5-3 through a pipeline. There is provided with a pipeline connecting a gas outlet of the fourth cyclone separator 5-3 to an exhaust gas treatment system. There is provided with a pipeline connecting each of a feed outlet at the upper portion of the primary bubbling bed body 5-1, a feed outlet at the bottom of the third cyclone separator 5-2 and a feed outlet at the bottom of the fourth cyclone separator 5-3 to a feed inlet of the pre-reduction section inter-bed feeder 5-4. A discharge port of the pre-reduction section inter-bed feeder 5-4 is connected to a feed inlet at the lower portion of the primary circulating bed riser 5-5 through a pipeline. A gas inlet at the bottom of the primary circulating bed riser 5-5 is connected to a gas outlet of the pre-reduction section gas heater 10 through a pipeline. An outlet at the top of the primary circulating bed riser 5-5 is connected to an inlet of the fifth cyclone separator 5-6 through a pipeline. A gas outlet at the top of the fifth cyclone separator 5-6 is connected to an inlet of the sixth cyclone separator 5-7 through a pipeline. The primary circulating dipleg 5-8 is provided at the lower portion of the fifth cyclone separator 5-6, and a return port at the lower portion of the primary circulating dipleg 5-8 is connected to a return port at the lower portion of the primary circulating bed riser 5-5 through a pipeline. There is provided with a pipeline connecting each of a discharge port at the lower portion of the primary circulating dipleg 5-8 and a feed outlet at the bottom of the sixth cyclone separator 5-7 to a feed inlet of the final reduction section feeder 6.

A discharge port of the final reduction section feeder 6 is connected to a feed inlet at the lower portion of the secondary bubbling bed body 7-1 of the final reduction section fluidized bed 7 through a pipeline. A gas inlet at the bottom of the secondary bubbling bed body 7-1 is connected to a gas outlet of the tenth cyclone separator 7-7 through a pipeline. There is provided with a pipeline connecting a gas outlet of the secondary bubbling bed body 7-1 to an inlet of the seventh cyclone separator 7-2. A gas outlet of the seventh cyclone separator 7-2 is connected to an inlet of the eighth cyclone separator 7-3 through a pipeline. There is provided with a pipeline connecting a gas outlet of the eighth cyclone separator 7-3 to the exhaust gas treatment system. There is provided with a pipeline connecting each of a feed outlet at the upper portion of the secondary bubbling bed body 7-1, a feed outlet at the bottom of the seventh cyclone separator 7-2 and a feed outlet at the bottom of the eighth cyclone separator 7-3 to a feed inlet of the final reduction section inter-bed feeder 7-4. A discharge port of the final reduction section inter-bed feeder 7-4 is connected to a feed inlet at the lower portion of the secondary circulating bed riser 7-5 through a pipeline. A gas inlet at the bottom of the secondary circulating bed riser 7-5 is connected to a gas outlet of the final reduction section gas heater 11 through a pipeline. An outlet at the top of the secondary circulating bed riser 7-5 is connected to an inlet of the ninth cyclone separator 7-6 through a pipeline. A gas outlet at the top of the ninth cyclone separator 7-6 is connected to an inlet of the tenth cyclone separator 7-7 through a pipeline. The secondary circulating dipleg 7-8 is provided at the lower portion of the ninth cyclone separator 7-6, and a return port at the lower portion of the secondary circulating dipleg 7-8 is connected to a return port at the lower portion of the secondary circulating bed riser 7-5 through a pipeline. There is provided with a pipeline connecting each of a discharge port at the lower portion of the secondary circulating dipleg 7-8 and a feed outlet at the bottom of the tenth cyclone separator 7-7 to an feed inlet of the discharger 8. There is provided with a pipeline connecting a discharge port of the discharger 8 to a feed inlet of the product bin 9.

Each of a gas inlet at the bottom of the pre-reduction section feeder 4, a gas inlet at the bottom of the pre-reduction section inter-bed feeder 5-4, a gas inlet at the bottom of the primary circulating dipleg 5-8, a gas inlet at the bottom of the final reduction section feeder 6, a gas inlet at the bottom of the final reduction section inter-bed feeder 7-4, a gas inlet at the bottom of the secondary circulating dipleg 7-8 and a gas inlet at the bottom of the discharger 8 is provided with a pipeline connected to a nitrogen main pipe, and each of the pipelines is provided with a regulating valve.

There is provided with a pipeline connecting each of a gas inlet of the pre-reduction section gas heater 10, a fuel gas inlet of the pre-reduction section gas heater 10, a gas inlet of the final reduction section gas heater 11 and a fuel gas inlet of the final reduction section gas heater 11 to a reducing gas main pipe, and each of the pipelines is provided with a regulating valve. There is provided with a pipeline connecting each of a combustion supporting air inlet of the pre-reduction section gas heater 10 and a combustion supporting air inlet of the final reduction section gas heater 11 to an air main pipe, and each of the pipelines is provided with a regulating valve.

The present example performs fluidized direct reduction of iron ore concentrate powder using the above system as follows. The powder and gas enter into and pass through the system simultaneously in the following way. The iron ore concentrate powder enters into the second cyclone separator 3-2 from the ore powder bin 1 via the screw feeder 2 for exchanging heat with the flue gas from the first cyclone separator 3-1, then enters into the first cyclone separator 3-1 for further exchanging heat with the hot flue gas from the reducing gas heater 10 and the final reducing gas heater 11, and then enters into the primary bubbling bed body 5-1 together with the powder collected by the cyclone dust collector 3-3 and the bag dust collector via the pre-reduction section feeder 4. The powder discharged from the feed outlet at the upper portion of the primary bubbling bed body 5-1 and the powder collected by the third cyclone separator 5-2 and the fourth cyclone separator 5-3 enter into the primary circulating bed riser 5-5 via the pre-reduction section inter-bed feeder 5-4. Part of the powder discharged from the outlet at the top of the primary circulating bed riser 5-5 is discharged via discharge ports at the lower portions of the fifth cyclone separator 5-6 and the primary circulating dipleg 5-8, and enters into the secondary bubbling bed body 7-1 together with the powder collected by the sixth cyclone separator 5-7 via the final reduction section feeder 6. The powder discharged from the feed outlet at the upper portion of the secondary bubbling bed body 7-1 and the powder collected by the seventh cyclone separator 7-2 and the eighth cyclone separator 7-3 enter into the secondary circulating bed riser 7-5 via the final reduction section inter-bed feeder 7-4. Part of the powder discharged from the outlet at the top of the secondary circulating bed riser 7-5 is discharged via discharge ports at the lower portions of the ninth cyclone separator 7-6 and the secondary circulating dipleg 7-8, and enter into the product bin 9 together with the powder collected by the tenth cyclone separator 7-7 via the discharger 8. The reducing gas is preheated by the pre-reducing gas heater 10, then enters into the primary circulating bed riser 5-5 to contact and reduce the ore powder, and enters into the primary bubbling bed body 5-1 via the fifth cyclone separator 5-6 and the sixth cyclone separator 5-7 for further reacting with the ore powder, and then is subjected to powder removing treatment by the third cyclone separator 5-2 and the fourth cyclone separator 5-3 and then enters into the exhaust gas treatment system via the pipeline. The reducing gas is preheated by the final reducing gas heater 11, then enters into the secondary circulating bed riser 7-5 to contact and reduce the ore powder, then enters into the secondary bubbling bed body 7-1 through the ninth cyclone separator 7-6 and the tenth cyclone separator 7-7 for further reaction with the ore powder, then is subjected to powder removing treatment by the seventh cyclone separator 7-2 and the eighth cyclone separator 7-3, and then enters into the exhaust gas treatment system via a pipeline. In the meantime, nitrogen enters into the reducing system through the gas inlet at the bottom of the pre-reduction section feeder 4, the gas inlet at the bottom of the pre-reduction section inter-bed feeder 5-4, the gas inlet at the bottom of the primary circulating dipleg 5-8, the gas inlet at the bottom of the final reduction section feeder 6, the gas inlet at the bottom of the final reduction section inter-bed feeder 7-4, the gas inlet at the bottom of the secondary circulating dipleg 7-8 and the gas inlet at the bottom of the discharger 8. The air and the reducing gas enter into the pre-reducing gas heater 10 and the final reducing gas heater 11 via the nozzle for combustion to generate heat for preheating the reducing gas, then enter into the first cyclone separator 3-1 and the second cyclone separator 3-2 sequentially to contact and exchange heat with the iron ore concentrate powder, and are subjected to solid removing treatment by the cyclone dust collector 3-3 and the bag dust collector 3-4, then enter into the flue gas treatment system via the pipeline. The iron oxide in the ore is reduced to metallic iron after the iron ore concentrate powder is subjected to preheating and two stages of reduction, and the reduction product is discharged to the product bin 9.

The raw material used in this example is an iron ore concentrate powder with a total iron content of 62 wt % and a particle size ranging from 0.01 to 0.5 mm. The reducing gas is a coke oven gas with a caloric value of 16-18 MJ/Nm$^3$. The iron ore concentrate powder was sent from the ore powder bin via the screw feeder to the ore powder preheater for preheating, then sequentially entered into the initial reduction section fluidized bed and the final reduction section fluidized bed which consist of the bubbling bed and the circulating bed in series via corresponding feeders, and finally were discharged into the product bin 9 through discharger 8 to give a reduced product. When the flue gas temperature at the inlet of the first cyclone separator was 500° C., the reduction temperature of the first stage bubbling bed body was 650° C., the reduction temperature of the first stage circulating bed riser was 750° C. with an operating gas velocity of 5 m/s, the reduction temperature of the second stage bubbling bed body was 850° C., the reduction temperature of the second stage circulating bed riser was 900° C. with an operating gas velocity of 5 m/s, and the mean retention time of the material in each stage of the fluidized bed was 30 min, the metallization ratio of iron in the reduced product was 87.21% after the reducing system was operated in a steady state. When the flue gas temperature at the inlet of the first cyclone separator 3-1 was 700° C., the reduction temperature of the first stage bubbling bed body was 750° C., the reduction temperature of the first stage circulating bed riser was 850° C. with an operating gas velocity of 5 m/s, the reduction temperature of the second stage bubbling bed body was 890° C., the reduction temperature of the second stage circulating bed riser was 950° C. with an operating gas velocity of 5 m/s, and the mean retention time of the material in each stage of the fluidized bed was 30 min, the metallization ratio of iron in the reduced product was 91.15% after the reducing system was operated in a steady state. When the flue gas temperature at the inlet of the first cyclone separator 3-1 was 650° C., the reduction temperature of the first stage bubbling bed body was 700° C., the reduction temperature of the first stage circulating bed riser was 850° C. with an operating gas velocity of 10 m/s, the reduction temperature of the second stage bubbling bed body was 860° C., the reduction temperature of the second stage circulating bed riser was 940° C. with an operating gas velocity of 10 m/s, and the mean retention time of the material in each stage of the fluidized bed was 30 min, the metallization ratio of iron in the reduced product was 94.32% after the reducing system was operated in a steady state.

What is claimed is:

1. A system for fluidized direct reduction of iron ore concentrate powder, comprising: an ore powder bin, a screw feeder, an ore powder preheater, a pre-reduction section feeder, a pre-reduction section fluidized bed, a final reduction section feeder, a final reduction section fluidized bed, a discharger, a product bin, a pre-reduction section gas heater and a final reduction section gas heater;

wherein the ore powder preheater comprises a first cyclone separator, a second cyclone separator, a cyclone dust collector and a bag dust collector;

the pre-reduction section fluidized bed comprises a primary bubbling bed body, a third cyclone separator, a fourth cyclone separator, a pre-reduction section inter-bed feeder, a primary circulating bed riser, a fifth cyclone separator, a sixth cyclone separator and a primary circulating dipleg;

the final reduction section fluidized bed comprises a secondary bubbling bed body, a seventh cyclone separator, an eighth cyclone separator, a final reduction section inter-bed feeder, a secondary circulating bed riser, a ninth cyclone separator, a tenth cyclone separator and a secondary circulating dipleg;

a feed outlet at the bottom of the ore powder bin is provided with a pipeline which is connected to a feed inlet of the screw feeder, and a feed outlet of the screw feeder is connected to an inlet of the second cyclone separator through a pipeline; further comprising a pipeline connecting a feed outlet at the bottom of the second cyclone separator to an inlet of the first cyclone separator, and pipelines connecting the inlet of the first cyclone separator to each of a flue gas outlet of the pre-reduction section gas heater and a flue gas outlet of the final reduction section gas heater; further comprising a pipeline connecting a gas outlet of the first cyclone separator to the inlet of the second cyclone separator, and a pipeline connecting a gas outlet of the second cyclone separator to an inlet of the cyclone dust collector, a gas outlet of the cyclone dust collector is connected to an inlet of the bag dust collector through a pipeline, and a gas outlet of the bag dust collector is connected to a flue gas treatment system through a pipeline; and further comprising pipelines connecting each of a feed outlet at the bottom of the first cyclone separator, a feed outlet at the bottom of the cyclone dust collector and a feed outlet of the bag dust collector to a feed inlet of the pre-reduction section feeder;

a discharge port of the pre-reduction section feeder is connected to a feed inlet at the lower portion of the primary bubbling bed body of the pre-reduction section fluidized bed through a pipeline, a gas inlet at the bottom of the primary bubbling bed body is connected to a gas outlet of the sixth cyclone separator through a pipeline, and further comprising a pipeline connecting a gas outlet of the primary bubbling bed body to an inlet of the third cyclone separator; a gas outlet of the third cyclone separator is connected to an inlet of the fourth cyclone separator through a pipeline, further comprising a pipeline connecting a gas outlet of the fourth cyclone separator to an exhaust gas treatment system, and pipelines connecting each of a feed outlet at the upper portion of the primary bubbling bed body, a feed outlet at the bottom of the third cyclone separator and a feed outlet at the bottom of the fourth cyclone separator to a feed inlet of the pre-reduction section inter-bed feeder; a discharge port of the pre-reduction section inter-bed feeder is connected to a feed inlet at the lower portion of the primary circulating bed riser through a pipeline, a gas inlet at the bottom of the primary circulating bed riser is connected to a gas outlet of the pre-reduction section gas heater through a pipeline, and an outlet at the top of the primary circulating bed riser is connected to an inlet of the fifth cyclone separator through a pipeline; a gas outlet at the top of the fifth cyclone separator is connected to an inlet of the sixth cyclone separator through a pipeline, the primary circulating dipleg is provided at the lower portion of the fifth cyclone separator, and a return port at the lower portion of the primary circulating dipleg is connected to a return port at the lower portion of the primary circulating bed riser through a pipeline; and further comprising pipelines connecting each of a discharge port at the lower portion of the primary circulating dipleg and a feed outlet at the bottom of the sixth cyclone separator to a feed inlet of the final reduction section feeder;

a discharge port of the final reduction section feeder is connected to a feed inlet at the lower portion of the secondary bubbling bed body of the final reduction section fluidized bed through a pipeline, a gas inlet at the bottom of the secondary bubbling bed body is connected to a gas outlet of the tenth cyclone separator through a pipeline, further comprising a pipeline connecting a gas outlet of the secondary bubbling bed body to an inlet of the seventh cyclone separator, and a gas outlet of the seventh cyclone separator is connected to an inlet of the eighth cyclone separator through a pipeline; further comprising a pipeline connecting a gas outlet of the eighth cyclone separator to the exhaust gas treatment system, and pipelines connecting each of a feed outlet at the upper portion of the secondary bubbling bed body, a feed outlet at the bottom of the seventh cyclone separator and a feed outlet at the bottom of the eighth cyclone separator to a feed inlet of the final reduction section inter-bed feeder; a discharge port of the final reduction section inter-bed feeder is connected to a feed inlet at the lower portion of the secondary circulating bed riser through a pipeline, a gas inlet at the bottom of the secondary circulating bed riser is connected to a gas outlet of the final reduction section gas heater through a pipeline, and an outlet at the top of the secondary circulating bed riser is connected to an inlet of the ninth cyclone separator through a pipeline; a gas outlet at the top of the ninth cyclone separator is connected to an inlet of the tenth cyclone separator through a pipeline, the secondary circulating dipleg is provided at the lower portion of the ninth cyclone separator, a return port at the lower portion of the secondary circulating dipleg is connected to a return port at the lower portion of the secondary circulating bed riser through a pipeline, and further comprising pipelines connecting each of a discharge port at the lower portion of the secondary circulating dipleg and a feed outlet at the bottom of the tenth cyclone separator to an feed inlet of the discharger; and further comprising a pipeline connecting a discharge port of the discharger to a feed inlet of the product bin.

2. The system according to claim 1, wherein each of a gas inlet at the bottom of the pre-reduction section feeder, a gas inlet at the bottom of the pre-reduction section inter-bed feeder, a gas inlet at the bottom of the primary circulating dipleg, a gas inlet at the bottom of the final reduction section feeder, a gas inlet at the bottom of the final reduction section inter-bed feeder, a gas inlet at the bottom of the secondary circulating dipleg and a gas inlet at the bottom of the discharger is provided with a pipeline connected to a nitrogen main pipe, and each of those pipelines is provided with a regulating valve;

further comprising pipelines connecting each of a gas inlet of the pre-reduction section gas heater, a fuel gas inlet of the pre-reduction section gas heater, a gas inlet of the final reduction section gas heater and a fuel gas inlet of the final reduction section gas heater to a reducing gas main pipe, and each of those pipelines is provided with a regulating valve; and further comprising pipelines connecting each of a combustion supporting air inlet of the pre-reduction section gas heater and a combustion supporting air inlet of the final reduction section gas heater to an air main pipe, and each of those pipelines is provided with a regulating valve.

3. A method for fluidized direct reduction of iron ore concentrate powder using the system according to claim 1, comprising: causing the powder and a reducing gas to enter into and pass through the system simultaneously in the following way: the iron ore concentrate powder enters into the second cyclone separator from the ore powder bin via the screw feeder for exchanging heat with flue gas from the first cyclone separator, then enters into the first cyclone separator for further exchanging heat with hot flue gas from the reducing gas heater and the final reducing gas heater, and then enters into the primary bubbling bed body together with powder collected by the cyclone dust collector and the bag dust collector via the pre-reduction section feeder; powder discharged from the feed outlet at the upper portion of the primary bubbling bed body and the powder collected by the third cyclone separator and the fourth cyclone separator enter into the primary circulating bed riser via the pre-reduction section inter-bed feeder, and part of powder discharged from the outlet at the top of the primary circulating bed riser is discharged via discharge ports at the lower portions of the fifth cyclone separator and the primary circulating dipleg, and enters into the secondary bubbling bed body together with powder collected by the sixth cyclone separator via the final reduction section feeder; powder discharged from the feed outlet at the upper portion of the secondary bubbling bed body and powder collected by the seventh cyclone separator and the eighth cyclone separator enter into the secondary circulating bed riser via the final reduction section inter-bed feeder, and part of powder discharged from the outlet at the top of the secondary circulating bed riser is discharged via discharge ports at the lower portions of the ninth cyclone separator and the secondary circulating dipleg, and enter into the product bin together with powder collected by the tenth cyclone separator via the discharger; the reducing gas is preheated by the pre-reducing gas heater, then enters into the primary circulating bed riser to contact and reduce the ore powder, and enters into the primary bubbling bed body via the fifth cyclone separator and the sixth cyclone separator for further reacting with the ore powder, and then is subjected to powder removing treatment by the third cyclone separator and the fourth cyclone separator and then enters into the exhaust gas treatment system via the pipeline connecting the outlet of the fourth cyclone separator to the exhaust gas treatment system; the reducing gas is preheated by the final reducing gas heater, then enters into the secondary circulating bed riser to contact and reduce the ore powder, then enters into the secondary bubbling bed body through the ninth cyclone separator and the tenth cyclone separator for further reaction with the ore powder, then is subjected to powder removing treatment by the seventh cyclone separator and the eighth cyclone separator, and then enters into the exhaust gas treatment system via a pipeline; in the meantime, nitrogen enters into the reducing system through a gas inlet at the bottom of the pre-reduction section feeder, a gas inlet at the bottom of the pre-reduction section inter-bed feeder, a gas inlet at the bottom of the primary circulating dipleg, a gas inlet at the bottom of the final reduction section feeder, a gas inlet at the bottom of the final reduction section inter-bed feeder, a gas inlet at the bottom of the secondary circulating dipleg and a gas inlet at the bottom of the discharger; air and the reducing gas enter into the pre-reducing gas heater and the final reducing gas heater via a nozzle for combustion to generate heat for preheating the reducing gas, then enter into the first cyclone separator and the second cyclone separator sequentially to contact and exchange heat with the iron ore concentrate powder, and are subjected to solid removing treatment by the cyclone dust collector and the bag dust collector, then enter into the flue gas treatment system via the pipeline connecting the outlet of the bag dust collector to the flue gas treatment system; preheating the iron ore concentrate powder and subjecting it to two stages of reduction, reducing the iron oxide in the ore to metallic iron, and discharging a reduction product to the product bin.

4. The method according to claim 3, wherein the iron ore concentrate powder is an iron-containing material powder with a total iron content of 50-70 wt %, which is obtained from mineral processing and enrichment of natural mineral or industrial solid waste, and the iron ore concentrate powder has a particle size of 0.01-0.5 mm.

5. The method according to claim 3, wherein both of the primary circulating bed riser and the secondary circulating bed riser are operated at a high gas velocity of 5-10 m/s.

6. The method according to claim 3, wherein the flue gas temperature at the inlet of the first cyclone separator of the ore powder preheater is 500-700° C., the reduction temperature of the pre-reduction section fluidized bed is 650-850° C., and the reduction temperature of the final reduction section fluidized bed is 850-950° C.

7. The method according to claim 3, wherein the reducing gas is coal gas or reformed gas with $H_2$ and CO as active ingredients and having a caloric value of 10-20 $MJ/Nm^3$.

\* \* \* \* \*